3,110,102
METHOD OF FUSION JOINING EMPLOYING STOP-OFF MATERIAL
Otto T. Pfefferkorn, Arcadia, Calif., assignor to North American Aviation, Inc.
No Drawing. Filed Oct. 31, 1958, Ser. No. 770,929
9 Claims. (Cl. 29—490)

This invention is concerned with a composition for preventing wettability by a molten metal of the material to which it is applied, and more specifically relates to the provision of a molten metal stop-off compound which restricts the flow of alloys or filler metals utilized in brazing or soldering processes and which is readily removable after use by simple water washing.

In soldering or brazing processes, it has been customary to apply a stop-off compound preparatory to application of the filler metal and subsequent heating in order to restrict the flow of the filler metal and any flux which may be used to the immediate vicinity of the joint. The employment of brazing stop-off compounds is important not only from the standpoint of improving the appearance of the finished article, but more importantly from the standpoint of avoiding the possible staining or corrosion of the parent metal and of increasing the strength of the brazed joint. In the latter regard, the application of a stop-off coating permits accumulation of molten filler metal to a greater extent than could otherwise be accomplished, thus making possible the formation of a fillet of controlled cross-section.

In the brazing of many conventional metals, as well as various newly evolving alloys, amongst which are precipitation hardenable steels, and other materials such as the cermets, conventional stop-off compositions such as refractory oxides, mixtures of metal halides, varnishes and polymeric compositions, which have been extensively used to prevent uncontrolled flow of the brazing filler metal into undesired areas, have proven to be of uncertain effectiveness in some instances and of complete ineffectiveness in others. The result of failure of the stop-off composition is the adherence of the workpiece and tool, or of the elements being secured together in areas where attachment is undesired, or of decreased joint strength with a consequent failure of the joint to conform to design specifications.

Known stop-off compounds which effectively prevent wetting of the parent materials in the desired predetermined areas are, in many instances, completely unsatisfactory for use because of their difficulty of removal from the workpieces after the brazing process has been completed. This problem is of special difficulty and critically in the brazing of honeycomb sandwich construction where, for many configurations, a "blind" brazing is accomplished by applying the filler metal to the desired areas of the joint and heating the assembly in a furnace to the selected brazing temperature. Even though such stop-off compositions may, in some cases, prevent metal flow and thus permit adherence only in the design areas, their difficulty and in some instances impossibility of removal renders them totally unsuited for use.

It is, therefore, a principal object of my invention to provide a new brazing stop-off composition which may be applied to a metal surface to prevent the flow of a brazing filler metal into the coated area and which can be easily and quickly removed from the part after brazing.

It is a further object of my invention to provide a new brazing stop-off composition which is effective in preventing filler metal flow across the surface thereof when applied to stainless steels, precipitation hardenable steels, cermets such as titanium carbide bonded with nickel and molybdenum, and various other metals which have heretofore lessened or eliminated the stop-off effectiveness of conventional materials.

It is an additional object of my invention to provide a brazing stop-off composition and method which are positive in stop-off action, simple of removal of the stop-off composition after brazing and economical of employment.

These, as well as further objects, will be apparent from a consideration of the following description inclusive of illustrative examples of the preferred embodiment of my invention.

In accordance with my invention, I have found that application of a coating composition, which comprises a mixture of levigated alumina and at least one member of the group consisting of the oxides of Si, Ti, Ge, Zr, Sn, Ce, Hf, Pb, and Th, to the surfaces of the members to be fusion joined effectively stops the flow of brazing materials while being readily removable from such surfaces after brazing by simply washing with water. While each of these constituents of my stop-off composition is, in some degree, individually effective to limit the flow of molten flux and filler metal, their independent utility and dependability are highly limited. On the other hand, oxides of the aforesaid group exhibits a synergistic effect upon levigated alumina with respect to its stop-off ability. Although I do not wish to be limited to any particular theory respecting the mechanism by which the desired results of my invention are obtained, it is believed that the levigated alumina particles form a mechanical type of barrier to the passage of material, while the oxides of the aforesaid group appear to arrest metal flow by the formation of a film. The use of alumina makes it possible to control the film location and provides a sufficiently impervious barrier to prevent the flow of molten materials through or across it. In any event, I have found that although the alumina and the oxides of the aforesaid group individually form more or less suitable stop-off compositions for certain metals, they have certain deficiencies even in consecutive tests on the same alloy to permit their routine employment. The oxides of the aforesaid group, when used alone, result in contamination and staining of the metals. The aluminum oxide alone is unsatisfactory for the reason that it permits alloy penetration. On the other hand, the combination of these materials was routinely effective with all metals tested.

Levigated alumina is a commercially available product which is sold in the form of a powder and is made by wet grinding alumina to sufficient fineness to cause it to remain in fluid suspension and then recovering the powder by evaporative processes. Paint grades of titanium dioxide and zirconium dioxide, an optical polishing grade of cerium dioxide, and a fine powdered grade of C.P. thorium dioxide, all of which are commercially available, may equally well be used in conjunction with the levigated alumina. However, since titanium dioxide is the cheapest of these compounds which are presently available, it is preferred for use. Although the latter materials are thus in powder form, of which the majority of particles are less than 325 mesh in size, a powder containing particles of somewhat greater size will be found to be satisfactory.

Particle size controls the effectiveness of the composition to a substantial extent since the stop-off ability of my compositions depends upon the surface area of the constituents. Nevertheless, a composition consisting of particles of up to 60 mesh size will perform the desired stop-off function. Larger particle sizes do not fall within the comprehension of my invention. However, since the required constituents are readily available in extremely fine particulate sizes, it is preferred to use them rather than compositions approaching the limiting 60 mesh particle size. The finer the particle size, the more advantageously can the composition be used. Finer sized particles adhere more tenaciously to the surfaces to which applied and form a suspension which can more readily be applied by spray coating methods.

While levigated alumina and an oxide of the aforesaid group constitute the essential constituents of my composition, it has been found desirable, although not absolutely essential, to incorporate these substances in an appropriate vehicle in order to permit their application by spraying or brushing to the parts to be treated. A slurry suitable for brush application can be prepared by incorporating the active solid constituents in a sufficient quantity of a hydrocarbon solvent to give a flowable consistency to the composition. The quantity of solvent required is not critical except that it be sufficient to provide a suitable consistency for brush application. Similarly, the specific hydrocarbon solvent which is employed is not critical. Non-limitative examples of hydrocrabon solvents which may be employed are Stoddard solvent, acetone, the various alcohols, benzene, naphtha, gasoline, and ethyl acetate. Water may also be employed as a vehicle for the mixture of aluminum oxide and an oxide of the aforesaid group, but in this event, the coated member should be dried at such a rate as to prevent any spalling of the coating prior to brazing. It is preferred, because of ease and rapidity of drying, to use a hydrocarbon solvent as the vehicle.

Alternative compositioins may be utilized to reduce the solid phase mixture to an acceptable liquid consistency for application. I have found that although the incorporation of a hydrocarbon solvent renders the composition completely suitable for use, the addition of a binding composition improves the spreadable consistency of the composition and renders it easier of application. I therefore contemplate incorporation of a binding composition in a referred stop-off composition. Amongst the binding compositions which will be found completely satisfactory are the acrylate resins, polymeric epoxy resins, melamines, the alkyds and various copolymers and other materials which increase cohesion of the composition.

Although the incorporation of a binding agent is not essential to the effectiveness of my brazing stop-off composition, it does substantially improve the cohesion of the resulting composition and thus increases the ease of application of the composition to the surface of the parent metal by brush or spray coating. A preferred composition thus contains levigated alumina, an oxide of the aforesaid group, a hydrocarbon solvent and a binding agent, and although the proportions of these ingredients are not critical, I have found that a composition containing the below indicated quantities is most satisfactory for ease of application and performs its stop-off function in a superior manner.

The active solids preferably comprise from 1 to 20 parts by weight of levigated alumina to 1 part by weight of at least one oxide of the aforesaid group, while the inert diluent comprises approximately 1 part by weight of binding agent to 10 parts by weight of hydrocarbon solvent. A spreadable consistency of sufficient cohesion may be obtained by combining 1 part by weight of the active solids with approximately 8 parts by weight of the inert diluent.

The method of my invention involves the application of a thin coating of the foregoing composition, or one which includes at least levigated alumina and an oxide of the aforesaid group, to the surface of a metallic member to define predetermined or selected uncoated areas. Any solvent or vehicle utilized in the composition is then evaporated, and filler metal and any desired flux applied to the surfaces of the metal in the predetermined uncoated areas. The metallic parts are assembled in the desired relationship and the assembly then heated to a brazing temperature in order to melt the filler metal. The part is subsequently cooled to the solidification temperature of the filler metal. The resulting fusion joined assembly has no filler metal present in any of the previously coated areas. The final step of my method simply involves washing the assembly with water to remove all traces of the coating. It will be noteed that the oxides remaining after brazing are readily removed by water washing without any necessity for grinding, acid wash or any other severe coating removal procedure.

I have found that the stop-off composition of my invention has further important utility in the manufacture of printed circuits. The method involved is different in its manipulative steps but involves employment of the same concept of protection against adherence of filler metal. Here a nonconductor is coated with my composition in all areas except where conductor metal is to be caused to adhere and the nonconductor sheet portions of the electical assembly immersed in a bath of molten brazing alloy or electrically conductive metal. After solidification, the sheet can be water washed to leave only the conductor adhered to the sheet in the desired circuit arrangement.

Thus, comprehensively stated, my method simply involves the application of my stop-off composition to a workpiece to define selected uncoated areas, the application of a filler metal to such areas in molten condition and the subsequent cooling of the workpiece to solidification and its water washing to remove coating residue. It should be noted that it is not significant whether the filler metal is first applied and then heated to its molten state or whether it is molten when applied. My composition is effective in either event.

The composition and process of my invention are illustrated further by the following examples:

*Example I*

Two members constructed of a PH15–7Mo precipitation hardenable steel, containing .08% carbon, 15.00% chromium, 7.25% nickel, .80% manganese, 2.50% molybdenum and 1.00% aluminum, were joined in various desired areas using a conventional brazing alloy comprised of sterling silver and lithium with the alloy flow controlled by the composition of my invention. A stop-off composition which consisted of a mixture of 1 part of an active solids component containing 10% titanium dioxide (paint grade) and 90% levigated alumina and 8 parts of an inert diluent containing 9% Brolite, H–10 Clear Baking (an acrylate resin available from the Andrew Brown Corporation of Los Angeles, California) and 91% of ethyl acetate, was brushed on the surfaces of the metallic members in a thin film adjacent to the area where filler metal was to adhere. A thin dry coating film was obtained by evaporating substantially all of the solvent present in the composition. The members were assembled in contacting relationship at the areas of intended joinder and a suitable flux and the sterling silver filler metal placed in the area of the joints. The assembly was then heated in an inert atmosphere to a temperature of 1800° F. to melt the brazing alloy and permit its even distribution in the areas of the desired braze. After solidification, the joint was washed with water, completely removing all traces of the residual oxides of the stop-off composition.

The resulting joint was clean and free of all undesired discontinuities. There was no evidence of any uncontrolled flow of filler metal past the stop-off composition coating boundaries.

Example II

Substantially the same procedure as described above was followed in accomplishing the joining of two members of a titanium carbide cermet containing 33.3% nickel, 6.7% molybdenum and trace amounts of columbium carbide. The resulting joint demonstrated the same superiority of characteristics described in Example I.

Example III

A further example of the broad applicability of my stop-off composition is demonstrated by the fusion joining of two members constructed of an AISI 446 stainless steel containing 0.2% nitrogen. In this brazing operation, an 82% gold-18% nickel filler alloy was used. The method and composition of the previous examples were used except that the stop-off composition was modified by using equal parts by weight of levigated alumina and titanium dioxide in the active solids component of the composition. Here too, the resulting joint satisfied all requirements of continuity of the fillet, absence of uncontrolled flow of filler metal and complete ease of stop-off coating oxides removal by water washing.

Examples IV to XI

These further examples are described together since the method of treatment was identical except for the stop-off compositions used. A quantity of brazing alloy sufficient to give an .016″ depth was placed at various locations on a sheet of AISI 321 stainless steel which had a composition of .07% carbon, 19% chromium, 9% nickel, .5% silicon, 1.1% manganese and .43% titanium. These localized areas of brazing alloy (comprised of 92.3% silver, 7.5% copper, 0.2% lithium) were encircled in successive tests by each of the following oxides: titanium dioxide, zirconium dioxide, cerium oxide, thorium oxide, silicon dioxide, and lead oxide. Similar areas of brazing alloy were encircled with compositions comprised individually of 1 part by weight of each of the oxides of the aforesaid group and 9 parts by weight of aluminum oxide. A second steel panel of AISI 321 steel alloy, with one side coated, in different areas coinciding with the locations of the brazing alloy on the first panel, with the same stop-off composition as that used in the same position on the first panel, was securely assembled in contact with the first panel. The assembly was then heated to a temperature above 1800° F., which caused the brazing alloy to melt and flow to the encircling stop-off line of each of the foregoing compositions. The second sheet was removed without difficulty, thus indicating the effectiveness of each of the foregoing compositions to prevent wetting of the steel panel through the stop-off compositions. Each of these panels was, however, very severely stained in those areas where the stop-off composition used consisted only of an oxide from the aforesaid group. Furthermore, it was not possible to remove the stains by the subsequent water washing step. On the contrary, the compositions which were comprised of one oxide of the aforesaid group and aluminum oxide did not stain the metal to any extent, and the resulting oxide coating was very easily removed at the end of the test by a simple water rinse of the steel panels.

It will be seen from the foregoing examples that my stop-off composition functions with the dependability, simplicity of complete removal of the composition after brazing and absence of uncontrolled metal filler flow necessary to an effective stop-off composition.

While my invention has been fully described and illustrated, it will be understood that this disclosure is for purposes of exemplification and is not to be taken by way of limitation, the spirit and scope of my invention being limited only by the terms of the accompanying claims.

I claim:
1. A method of fusion joining a plurality of members comprising applying a thin coating of a brazing stop-off composition to the surface of such members to define uncoated areas in the vicinity of the desired joint, said composition having a surface protecting solids content consisting essentially of from about 1 to about 20 parts of levigated alumina and 1 part of at least one oxide of the group consisting of the oxides of Si, Ti, Ge, Zr, Sn, Ce, Hf, Pb, and Th, applying filler metal to said members in said uncoated areas, maintaining said members and said filler metal at a temperature sufficient to form a bond between said members, and cooling said bonded members to solidify said filler metal and form a permanent bond.

2. The method of claim 1 with the additional step of washing said cooled members with water in order to remove the residue of said coating.

3. The method of claim 1 in which said composition includes an inert liquid diluent in an amount sufficient to make the composition of a spreadable consistency.

4. The method of claim 1 in which said composition includes a liquid diluent inert to said surface protecting solids, said diluent having dissolved therein a minor amount of a resinous binding agent, the amount of said diluent and said binding agent being sufficient to provide a composition having a spreadable consistency.

5. The method of claim 1 in which said oxide is titanium dioxide.

6. A method of fusion joining a plurality of members comprising applying a thin coating of a brazing stop-off composition to the surface of such members to define uncoated areas in the vicinity of the desired joint, said composition consisting essentially of a surface protecting solids content and an inert liquid diluent in an amount sufficient to make the composition of spreadable consistency, said solids content consisting essentially of from about 1 to about 20 parts of levigated alumina and 1 part of at least one oxide of the group consisting of the oxides of Si, Ti, Ge, Zr, Sn, Ce, Hf, Pb, and Th, applying filler metal to said members in said uncoated areas, maintaining said members and said filler metal at a temperature sufficient to form a bond between said members, cooling said bonded members to solidify said filler metal and form a permanent bond, and washing said cooled members with water in order to remove the residue of said coating.

7. The method of claim 6 in which said diluent is comprised of substantially 10 parts by weight of a liquid hydrocarbon solvent and 1 part by weight of a resinous binding agent, the amount of said diluent being sufficient to make the composition a slurry of a spreadable consistency.

8. A method of fusion joining a plurality of members which comprises applying a thin coating of a brazing stop-off composition to the surface of such members to define uncoated areas in the vicinity of the desired joint, said composition having a surface protecting solids content consisting essentially of from about 1 to about 20 parts of levigated alumina and 1 part of at least one oxide of the group consisting of the oxides of Si, Ti, Ge, Zr, Sn, Ce, Hf, Pb, and Th, applying filler metal to said members in said uncoated areas, heating said metal to above its melting point to form a fluid metal bond between said members, and cooling said bonded members to solidify said filler metal and form a permanent bond.

9. A method of fusion joining a plurality of members which comprises applying a thin coating of a brazing stop-off composition to the surface of such members to define uncoated areas in the vicinity of the desired joint said composition having a surface protecting solids content consisting essentially of from about 1 to about 20 parts of levigated alumina and 1 part of at least one oxide of the group consisting of the oxides of Si, Ti, Ge, Zr, Sn, Ce, Hf, Pb, and Th, applying filler metal to said areas in a molten condition, maintaining the temperature of said members and said filler metal above the melting point of said filler metal to form a fluid metal bond between said members, and cooling to solidify said filler metal and form a permanent bond.

References Cited in the file of this patent

UNITED STATES PATENTS

| | | |
|---|---|---|
| 2,232,860 | McDougal et al. | Feb. 25, 1941 |
| 2,342,357 | Miller | Feb. 22, 1944 |
| 2,343,158 | Scott | Feb. 29, 1944 |
| 2,473,887 | Jennings et al. | Jan. 21, 1949 |
| 2,538,959 | Ballard | Jan. 23, 1951 |
| 2,563,499 | Smith | Aug. 7, 1951 |
| 2,931,743 | Rittmann | Apr. 5, 1960 |
| 3,022,195 | Hackley et al. | Feb. 20, 1962 |

FOREIGN PATENTS

| | | |
|---|---|---|
| 725,778 | Great Britain | Mar. 9, 1955 |
| 822,916 | Great Britain | Nov. 4, 1959 |